(12) United States Patent
Duvernier

(10) Patent No.: US 9,821,815 B2
(45) Date of Patent: Nov. 21, 2017

(54) ESTIMATING ADHESION POTENTIAL BY ASSESSING ROLLING RADIUS

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Marc Duvernier, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 15/103,947

(22) PCT Filed: Dec. 15, 2014

(86) PCT No.: PCT/FR2014/053340
§ 371 (c)(1),
(2) Date: Jun. 13, 2016

(87) PCT Pub. No.: WO2015/092246
PCT Pub. Date: Jun. 25, 2015

(65) Prior Publication Data
US 2016/0362115 A1 Dec. 15, 2016

(30) Foreign Application Priority Data
Dec. 18, 2013 (FR) ..................... 13 62880

(51) Int. Cl.
*G01M 17/00* (2006.01)
*G06F 7/00* (2006.01)
(Continued)

(52) U.S. Cl.
CPC ............. *B60W 40/12* (2013.01); *B60T 8/172* (2013.01); *B60W 40/068* (2013.01);
(Continued)

(58) Field of Classification Search
CPC .... B60W 40/12; B60W 40/13; B60W 40/068; B60W 2550/148; B60W 2550/12;
(Continued)

(56) References Cited

U.S. PATENT DOCUMENTS

| 4,947,332 A | 8/1990 | Ghoneim ................. 364/426.03 |
| 5,513,907 A * | 5/1996 | Kiencke ............. B60G 17/0195 180/197 |

(Continued)

FOREIGN PATENT DOCUMENTS

| EP | 0 412 791 A2 | 2/1991 |
| EP | 1 076 235 A1 | 2/2001 |

(Continued)

OTHER PUBLICATIONS

T.D. Gillespie, "Fundamentals of Vehicle Dynamics," SAE (Society of Automotive Engineers), pp. 1-470 (1992).

*Primary Examiner* — Jaime Figueroa
(74) *Attorney, Agent, or Firm* — Fitzpatrick, Cella, Harper & Scinto

(57) ABSTRACT

A method is provided for determining an adhesion potential of a tire mounted on a wheel and travelling over ground. The method utilizes a database constructed to contain information obtained by evaluating experimental data on an evolution of a rolling radius of the tire as a function of predetermined rolling conditions of the tire on ground of variable and known adhesion. Based on the information in the database, an estimation model ($M_{adpot}$) of an adhesion potential is established by determining a function linking an adhesion potential ($\mu_{max}$) of the tire to a rolling radius (RRt) of the tire and to vehicle parameters. The rolling radius (RRt) of the tire is determined while the tire is rolling. The
(Continued)

adhesion potential ($\mu_{max}$) of the tire is evaluated by application of the estimation model ($M_{adpot}$) and as a function of the vehicle parameters.

15 Claims, 3 Drawing Sheets

(51) Int. Cl.
    *G06F 19/00*     (2011.01)
    *B60W 40/12*     (2012.01)
    *B60W 40/068*     (2012.01)
    *B60T 8/172*     (2006.01)
    *B60W 40/13*     (2012.01)

(52) U.S. Cl.
    CPC .......... *B60W 40/13* (2013.01); *B60T 2210/12* (2013.01); *B60W 2520/10* (2013.01); *B60W 2520/28* (2013.01); *B60W 2550/12* (2013.01); *B60W 2550/148* (2013.01); *B60W 2550/402* (2013.01)

(58) Field of Classification Search
    CPC ....... B60W 2550/402; B60W 2520/28; B60W 2520/10; B60T 8/172; B60T 2210/12
    USPC ..................................................... 701/1, 32.9
    See application file for complete search history.

(56) References Cited

U.S. PATENT DOCUMENTS

| | | | | |
|---|---|---|---|---|
| 6,577,941 B2 * | 6/2003 | Kawasaki | ............... | B60T 8/172 701/70 |
| 6,763,288 B2 * | 7/2004 | Caretta | ................ | B60C 23/066 340/442 |
| 9,037,376 B2 * | 5/2015 | Ogawa | .................... | B60T 8/172 701/80 |
| 2002/0162389 A1 * | 11/2002 | Yokota | .................... | B60C 23/06 73/146 |
| 2003/0050743 A1 * | 3/2003 | Caretta | ................. | B60C 23/066 701/1 |
| 2003/0120413 A1 * | 6/2003 | Park | ....................... | B60T 8/1703 701/71 |
| 2005/0065698 A1 | 3/2005 | Bertrand | ......................... | 701/80 |
| 2005/0102086 A1 * | 5/2005 | Nakao | .................... | B60T 8/172 701/80 |
| 2006/0253243 A1 * | 11/2006 | Svendenius | ............. | B60T 8/172 701/70 |
| 2007/0061061 A1 * | 3/2007 | Salman | .................... | B60T 8/172 701/80 |
| 2007/0132311 A1 * | 6/2007 | Giazotto | ............... | B60T 8/1703 303/126 |
| 2007/0213911 A1 * | 9/2007 | Trombley | ........... | B60T 8/17558 701/70 |
| 2008/0021626 A1 * | 1/2008 | O'Dea | .................... | B60T 8/172 701/80 |
| 2008/0154471 A1 | 6/2008 | Garcia et al. | .................... | 701/75 |
| 2008/0243348 A1 * | 10/2008 | Svendenius | ............. | B60T 8/172 701/90 |
| 2011/0295457 A1 * | 12/2011 | Linda | ...................... | B60T 8/172 701/498 |
| 2012/0173091 A1 | 7/2012 | Hukkeri | ......................... | 701/50 |
| 2012/0179327 A1 * | 7/2012 | Yngve | ................ | B60W 40/064 701/32.9 |

FOREIGN PATENT DOCUMENTS

EP           2 138 372 A1     12/2009
WO    WO 03/066399 A1     8/2003

* cited by examiner

ESTIMATING ADHESION POTENTIAL BY ASSESSING ROLLING RADIUS

FIELD OF THE INVENTION

The invention concerns the field of tires for motor vehicles. The invention more particularly addresses the evaluation in real time of the conditions of adhesion of the vehicle to the ground, so as to be able to advise the driver, or onboard safety systems, of modifications of the rolling conditions that could put the vehicle and its passengers in hazard.

RELATED ART

A number of systems for estimating the adhesion of a tire to the ground have been described in the past.

The first systems for measuring the adhesion potential offered by original equipment manufacturers are based on ABS type systems and ESP type control. These systems construct the coefficient of adhesion of the tire to the ground by calculation, and therefore indirectly, without measuring the forces developed in the area of contact.

More recently, the document EP 1 076 235 proposes to determine adhesion potential by using a sensor to measure the tangential forces to which a given sculpture element is subjected when that sculpture element enters the area of contact. However, this method comes up against the difficulty encountered in placing and maintaining in an operating condition a sensor disposed in a sculpture element of the tire tread, which is particularly exposed to impacts and to all kinds of aggression.

The document WO03/066399 describes a method for determining the adhesion potential of a tire and the adhesion margin available by measuring in a frame of reference tied to the vehicle variations of the circumferential distances of fixed points situated at different azimuths along the circumference of the tire sidewall. However, this method necessitates the existence of a large slippage zone in the area of contact and will produce pertinent information only when the vehicle is close to conditions starting from which the tire really begins to slip on the ground. This alarm may be deemed too late to be considered as driving assistance.

BRIEF DESCRIPTION OF EMBODIMENTS OF THE INVENTION

In the frame of reference of the tire, the axis OX is the axis representing the circumferential direction of the tire, the axis OY is the axis parallel to the axis of rotation of the tire or transverse axis, and the axis OZ is the axis normal to the axis of rotation of the tire, or radial axis.

Hereinafter, the coefficient of adhesion, designated by the letter $\mu$, will be defined as the ratio between the tangential loads and the normal loads applied at the level of the area of contact.

Here, the term loads is to be understood in a wide sense as covering loads, forces or deformations applied at a given point, on the understanding that these magnitudes are linked to one another in a known manner.

The coefficient of adhesion at the level of the area of contact at a given time will therefore be expressed in the form:

$$\mu_t = \sqrt{\frac{\sigma_x^2 + \sigma_y^2}{\sigma_z^2}},$$

where $\sigma_x$ represents the tangential load along the X axis;
where $\sigma_y$ represents the tangential load along the Y axis;
and where $\sigma_z$ represents the pressure load along the Z axis, which is substantially constant during most of the passage in the area of contact.

The adhesion potential $\mu_{max}$ at the level of the area of contact corresponds to the maximum value of the ratio between the tangential force and the normal force that the tire is able to withstand when in contact with the ground. This adhesion potential is liable to be modified as a function of the nature of the ground over which the vehicle is travelling. The difference between the adhesion potential $\mu_{max}$ and the adhesion coefficient $\mu_t$ constitutes the adhesion margin ($\mu_{max}$-$\mu_t$) of the tire.

The invention is based on measuring and analyzing the rolling radius of the tire.

The rolling radius may be defined as the distance travelled on the ground when the tire effects one wheel revolution divided by $2\pi$.

The value of the rolling radius is conventionally measured when the wheel slips, because of the effect of a high driving torque, the distance travelled per wheel revolution is then shorter and the rolling radius decreases. Conversely, when a braking torque is applied, the wheel slows down and, at the limit, may lock up, while the vehicle continues to move forward, and the rolling radius increases.

In an equivalent manner the rolling radius may be defined as the ratio between the linear speed of the vehicle in m/s and the rotation speed of the wheel in rad/s, or as the ratio between a ground distance travelled during a given time interval and the angular variation of the wheel about its axis during the same time interval.

Close observation makes it possible to show that, if the adhesion potential varies, the rolling radius also varies under free rolling conditions, i.e. in the absence of braking or driving torque.

It appears in fact that localised microslippages between the tread and the ground in the area of contact mean that the wheel has to turn slightly faster relative to maximum adhesion conditions to maintain the vehicle at a constant speed.

It is then found that, relative to maximum adhesion conditions, the rolling radius decreases if the adhesion potential of the tire on the ground decreases, and it is as if it were necessary to apply an additional driving torque.

The invention proposes to exploit this observation and to determine an adhesion potential as a function of the direct observation of the evolution of the rolling radius. These variations, which are of small amplitude, are nevertheless detectable with sufficient accuracy to enable determination of the adhesion coefficient of the tire. As will become clear later, this also necessitates controlling with a small error margin parameters linked to the vehicle and liable to interact with the measurement of the rolling radius.

The method in accordance with the invention for determining an adhesion potential of a tire mounted on a wheel of a vehicle travelling over ground includes steps during which:

the evolution of a rolling radius of the tire as a function of predetermined rolling conditions of said tire on ground of variable and known adhesion is evaluated to construct an experimental database, based on the experimental database, an estimation model of the adhesion potential is established by determining a function linking the adhesion potential to the rolling radius and to vehicle parameters, the rolling radius is determined while the tire is rolling and the adhesion potential of said tire is evaluated by application of said model and as a function of the vehicle parameters.

Determining the adhesion potential therefore involves the construction of a model based on experimental data obtained under known rolling conditions specific to a given tire and by application of this model under the ordinary rolling conditions of the vehicle.

It is also seen that, in the context of rapid evaluation, the number of influencing parameters may be relatively small. The use of the method in accordance with the invention is also facilitated by the fact that these parameters are nowadays available with sufficient accuracy via monitoring and driving assistance means installed in most modern vehicles, which makes it possible to determine the adhesion potential with the required accuracy.

The method in accordance with the invention may also include the following features separately or in combination:
- the rolling radius is evaluated by establishing the ratio between a speed of movement of the vehicle relative to the ground and a speed of rotation of the wheel about its axis.
- the rolling radius is determined by averaging measurements of the rolling radius acquired during a particular mean period.
- the mean period is between 1 and 10 seconds inclusive and preferably between 2.5 and 3.5 seconds inclusive.
- the rolling radius is determined by evaluating the speed of movement of the vehicle relative to the ground using a GPS system onboard the vehicle and the rotation speed of the wheel using a coder generating a plurality of pulses on each wheel revolution.
- the rolling radius is determined on each pulse generated by said coder.
- the estimation model of the adhesion potential is applied when the rolling radius is below a predetermined threshold.
- the estimation model ($M_{adpot}$) of the adhesion potential ($\mu_{max}$) is of the form:

$$\mu_{max} = \alpha_1 e^{(RRt)} + \alpha_2 Z e^{(RRt)} + \alpha_3 P e^{(RRt)} + \alpha_4 Z + \alpha_5 P + \alpha_6 PZ + \alpha_7$$

where RRt represents the rolling radius, Z a load applied to the wheel, P a tire pressure value, and $\alpha_1, \alpha_2, \alpha_3, \alpha_4, \alpha_5, \alpha_6, \alpha_7$ are constants.
- the tire pressure value is given by the expression:

$$P = P_{TPMS} + \alpha_8 V_{sol}^2$$

where $P_{TPMS}$ represents a value of the pressure given by a sensor accommodated inside the tire, $V_{sol}$ represents the speed of movement of the vehicle relative to the ground and $\alpha_8$ is a constant.
- a free load applied to the wheel is evaluated by carrying out the steps during which, when the vehicle is not engaged in a turn and is not subject to any transverse or longitudinal acceleration, when a zero drive/braking torque is applied to the wheel, and when the wheel is under free rolling conditions:
  - it is detected that the vehicle is rolling on a dry ground,
  - the value of the rolling radius is estimated, and
  - using the model, the value of the free load making it possible to obtain an adhesion potential equal to 1 is looked for.
- a mean free load is determined throughout travel over dry ground.
- the adhesion potential is determined using the estimate model on the basis of the measurement of the rolling radius, the tire pressure value and the known free load or the mean free load.
- the adhesion potential is determined using the estimation model on the basis of the measurement of the rolling radius, the tire pressure value, and a load equal to an instantaneous load applied to the wheel and calculated using a function defining the dynamic of the vehicle on the basis of vehicle data at a given moment comprising:
  - the free load or the mean load applied to the wheel, and/or
  - a drive or braking torque, and/or
  - a drift angle, and/or
  - transverse and longitudinal accelerations, and/or
  - a camber angle.
- the load is evaluated as a function of a measurement of a distance between a point situated on a chassis of the vehicle and a point situated on a support of the wheel and a stiffness of a suspension connecting said support to said chassis.
- the adhesion potential of a tire mounted a non-steered and non-driving wheel is determined.

BRIEF DESCRIPTION OF THE DRAWINGS

The invention will be better understood on reading the appended figures, which are provided by way of example in the case of a passenger vehicle and have no limiting character, in which figures.

DETAILED DESCRIPTION OF EMBODIMENTS OF THE INVENTION

Figure 1:
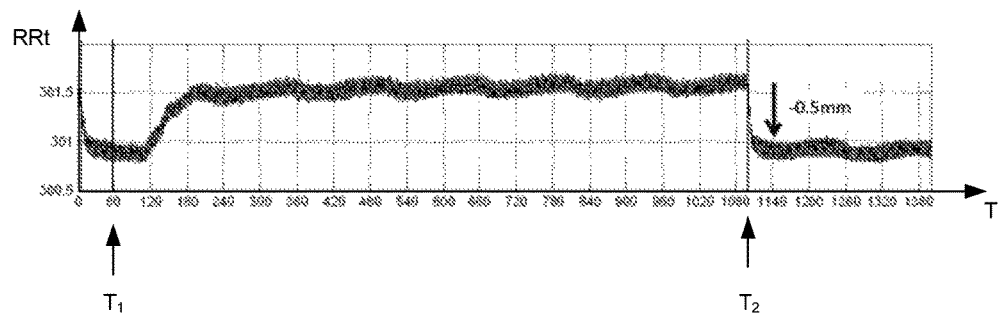
FIG. 1 represents an experiment plan demonstrating the evolution of the rolling radius as a function of a variation of the adhesion potential.

FIG. 1, showing the phenomenon on which the invention relies, makes it possible to visualise the measurement of the rolling radius of a non-driving and non-steered wheel when successively travelling over wet ground between 0 and $T_1$ and over dry ground between $T_1$ and $T_2$ and again over wet ground beyond $T_2$ in the case of a vehicle travelling in a straight line at constant speed.

It is seen that the rolling radius RRt increases by 0.5 mm on the transition from travelling over wet ground to travelling over dry ground and decreases by the same amount on passing from dry ground to wet ground.

Figure 2:
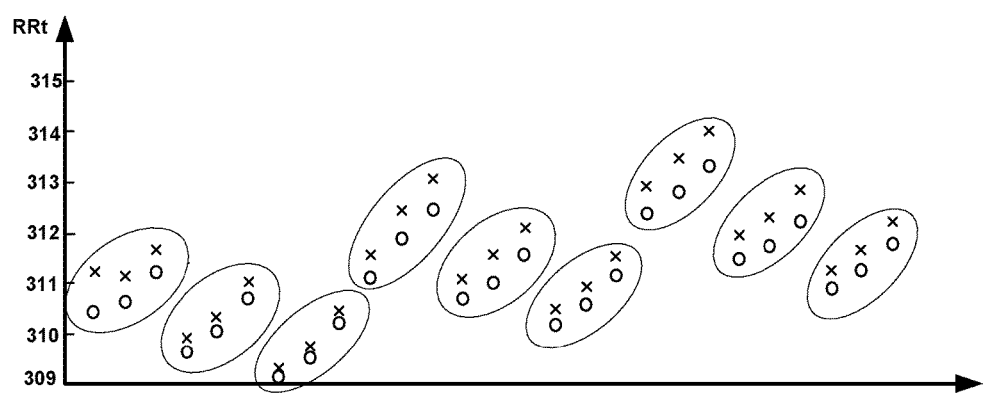
FIG. 2 represents an experiment plan similar to the previous one under different conditions of speed, load and pressure.

FIG. 2 reproduces this experiment plan for different speeds, real load conditions and inflation pressures. There is again seen a variation of the rolling radius on passing from dry ground (represented by crosses) to wet ground (represented by circles) and vice versa.

The method then consists in building a relation between the rolling radius and the adhesion potential as a function of the vehicle parameters having the greatest influence, such as the speed, the load, the tire inflation pressure, the braking or driving torque or the transverse forces exerted on the tire when the latter is subject to a drift angle or a camber angle.

The first order vehicle parameters liable to modify the rolling radius, and therefore the determination of the adhesion potential, are the load and the tire pressure. The longitudinal forces linked to the existence of a braking torque or a driving torque and the transverse forces linked to the tire starting to drift or to the camber angle are involved only for calculating the load. Accordingly, considering the longitudinal and transverse forces to be virtually zero, which is the case if the vehicle is not being subjected to a particular manoeuvre, it is possible to evaluate the adhesion potential of the tire and therefore to know the level of adhesion that is available should the vehicle brake or make a turn at a certain speed.

For this reason, a non-driving and non-steered wheel, such as rear wheel on a front wheel drive type vehicle, for example, is of more particular interest. It will therefore be verified that the brakes are not activated and that the steering wheel angle is equal to zero before measuring the rolling radius when rolling. This information is generally available at any time on modern vehicles equipped with driving assistance systems such as an electronic stability program (ESP).

In accordance with one preferred embodiment, a box is plugged into the diagnostic socket of the vehicle; this box may contain the GPS system and also makes it possible to access the signals of the driving assistance systems of the vehicle, notably the electronic trajectory corrector or ESP.

Figure 3:
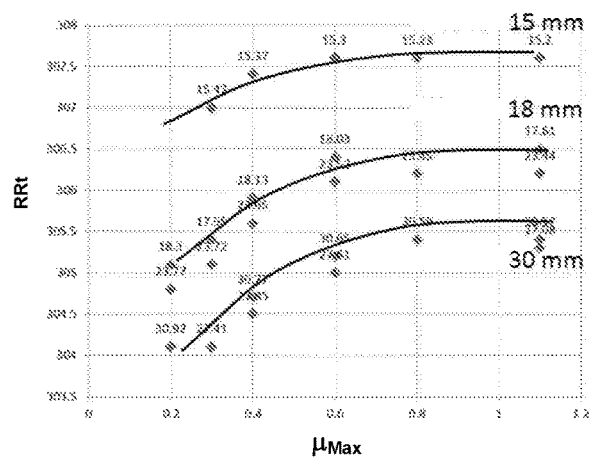
FIG. 3 represents the variation of the rolling radius as a function of the adhesion potential for different loads and pressures.

FIG. 3 shows the evolution of the rolling radius RRt as a function of the value of the adhesion potential $\mu_{max}$ for different load and pressure conditions represented by different deflection values, respectively for a deflection of 30 mm, 18 mm and 15 mm. Here the deflection is equal to the difference between the radius of the inflated tire in the free state and the radius of the tire under load.

All of the data measured experimentally then makes it possible to determine a model $M_{adpot}$ relating the adhesion potential $\mu_{max}$, and the rolling radius and a function of the load and the pressure. These measurements are effected at speeds between 30 km/h and 110 km/h inclusive.

The model $M_{adpot}$ obtained is of the general form:

$$\mu_{max} = \alpha_1 e^{(RRt)} + \alpha_2 Z e^{(RRt)} + \alpha_3 P e^{(RRt)} + \alpha_4 Z + \alpha_5 P + \alpha_6 P Z + \alpha_7$$

where Z represents the load supported by the tire, P represents a tire pressure value and the values $\alpha_1$, $\alpha_2$, $\alpha_3$, $\alpha_4$, $\alpha_5$, $\alpha_6$, $\alpha_7$, represent coefficients determined experimentally.

It is seen that the adhesion potential has an impact on the rolling radius that increases as that potential decreases.

The accuracy of the determination of the adhesion potential will then depend on the accuracy of the measurement of the value of the rolling radius and also on an accurate knowledge of the value of the pressure and of the load applied to the wheel and of the tire pressure. To be more specific, the rolling radius varies within a range of a few tenths of a millimetre and this therefore requires that this value be evaluated with a controlled error margin.

The rolling radius is determined in a simple manner by establishing the ratio between the speed of movement of the vehicle relative to the ground ($V_{sol}$) and the rotation speed of the wheel about its axis ($\Omega$).

$$RRt = V_{sol}/\Omega$$

The ground speed $V_{sol}$ is obtained from data collected by the GPS navigation system, for example with an accuracy of 0.1 km/h.

The rotation speed ($\Omega$) of the wheel about its axis may be determined using the wheel coder used by the antilock braking system (ABS) and typically producing 196 pulses per wheel revolution.

It is possible to increase the accuracy of the rolling radius calculation by averaging rolling radii measured over a predetermined mean duration. A mean duration of 3 seconds makes it possible to obtain an acceptable error margin. However, it appears necessary to limit this mean duration to around ten seconds so as not to penalise the time to make information on the adhesion potential available and to guard against the consequences of rapid evolution of the rolling conditions.

The rolling radius is then calculated on each pulse from the wheel coder. Accordingly, for a mean duration of 3 seconds at a speed of 90 km/h, the rolling radius is estimated 7350 times and an accuracy in terms of the determination of the rolling radius of the order of +/−0.15 mm can be expected with a confidence of 95%.

Alternatively, it is possible to measure a distance (d) travelled during a given time and to measure the angular variation (a) of the wheel during the same time interval. The rolling radius is obtained by establishing the ratio between these two values: RRt=d/a.

The load and pressure data comprises vehicle parameters that are not normally liable to vary greatly during a particular journey. By journey is meant the movement of the vehicle between stopping twice or between the engine being stopped twice.

The tire pressure is obtained by acquiring data originating from the pressure sensor (TPMS) accommodated in the tire. It is possible to achieve an accuracy of the order of 0.1 bar with a confidence of 95%.

To take account of certain centrifugal effects, the pressure may be corrected as a function of the speed in the following manner:

$$P = P_{TPMS} + \alpha_8 V_{sol}^2$$

where $P_{TPMS}$ represents the pressure measured by the pressure sensor accommodated in the tire, $V_{sol}$ represents the speed of the vehicle relative to the ground and $\alpha_8$ is a coefficient determined experimentally.

The load Z may be determined in various ways.

A first and direct way is to measure a distance variation between a fixed point on the chassis of the vehicle and a point on the support of the wheel. The load is deduced from this taking account of the stiffness of the suspension connecting the wheel support to the chassis. However, this method is impacted by instantaneous variations caused by irregularities of the road surface and necessitates filtering of the acquired data.

Another method consists in using the adhesion prediction model $M_{adpot}$ to predict adhesion under particular conditions, making a hypothesis as to the value of the adhesion potential and seeking the value $Z_{free}$ the load yielding this value on the basis of the of rolling radius and the pressure measured when travelling under the conditions explained above.

This hypothesis is easily to verify when the vehicle is travelling over dry ground and the adhesion potential is generally equal to or greater than 1. This condition can be met using an acoustic detector of the noise generated by the rolling tire, for example, or information relating to activation or deactivation of the windscreen wipers.

It is then detected that the wheel is not subjected to any braking or driving torque, for example by observing the brake or accelerator pedal, and that the vehicle is not making a turn and is not subject to transverse or longitudinal accelerations, which can be verified using accelerometers placed in the vehicle, for example, or by observing the steering angle; the wheel is under free rolling conditions. The rolling radius and the tire pressure are then measured under the conditions stated above. Then the load $Z_{free}$ giving an adhesion potential equal to 1 is looked for by applying the model $M_{adpot}$ for determining the adhesion potential.

This measurement may be carried out as many times as necessary while the vehicle is travelling over dry ground to obtain a mean free load $Z_{meanfree}$ calculated with a good confidence.

This method makes it possible to determine the load borne by the wheel with an accuracy of +/−50 daN and a confidence of 95%. This free load value, or the mean free load value, which varies little during the same journey, is then stored to serve as a basis for subsequent calculations, in particular in the situation where the vehicle encounters rolling conditions on wet or slippery ground during this journey. After verifying that the braking or driving torque applied to the wheel is zero and that the vehicle is not making a turn and is not subjected to transverse and/or longitudinal accelerations, the model $M_{adpot}$ for determining the adhesion potential is applied taking the value of the load Z as equal to the free load $Z_{free}$ or to the mean free load $Z_{meanfree}$, the value of which is immediately available without calling for additional calculations.

In a complementary way it is also possible to determine on the basis of the free load $Z_{free}$ or the mean free load $Z_{meanfree}$ a value $Z_{inst}$ of the instantaneous load taking into account the transverse and longitudinal loads imposed on the wheel. It is then necessary to acquire additional information available on the vehicle BusCAN, such as the transverse or longitudinal acceleration, the driving or braking torque, the steering wheel angle or drive angle, and the camber angle, and to apply a dynamic model specific to the vehicle making it possible to calculate the instantaneous load $Z_{inst}$ applied to the wheel.

The aforementioned box plugged into the diagnostic socket of the vehicle can facilitate accessing this information periodically.

These models, well known to the person skilled in the art, are not part of the present invention and may be generated on the basis of the following publications, for example: "Fundamentals of vehicle dynamics", 1992, by T. D. GILLESPIE, "Les liaisons au sol", 1995, by T. HALCONRUY, "A new tire model for vehicle dynamics simulations" by BAYLE, FORISSIER and LAFON of the company submitting the present application, on the basis of the model proposed by PACEJKA.

An adhesion potential $\mu_{max}$ representing the instantaneous rolling conditions of the tire is then determined using the model $M_{adpot}$.

With the stated measurement accuracies, the adhesion potential is estimated with an accuracy of the order of +/−0.2 with a confidence of 95%.

Figure 4:
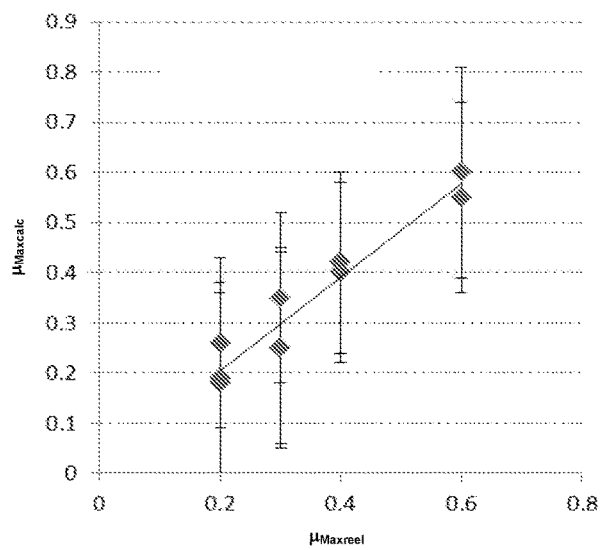
FIG. 4 represents a distribution of the adhesion potential values calculated from measured radius values as a function of a given real adhesion potential.

FIG. 4 makes it possible to appreciate the spread of the evaluation of the calculated adhesion potential $\mu_{maxcalc}$ as a function of the real adhesion potential $\mu_{maxreal}$ It is seen that this spread is greater for high values of the adhesion potential $\mu_{max}$, in other words, when the vehicle is travelling under conditions far from conditions liable to place it in hazard. Also, the accuracy increases for lower values of $\mu_{max}$, which makes it possible to obtain the most accurate information when the vehicle moves onto more slippery terrain.

Figure 5:
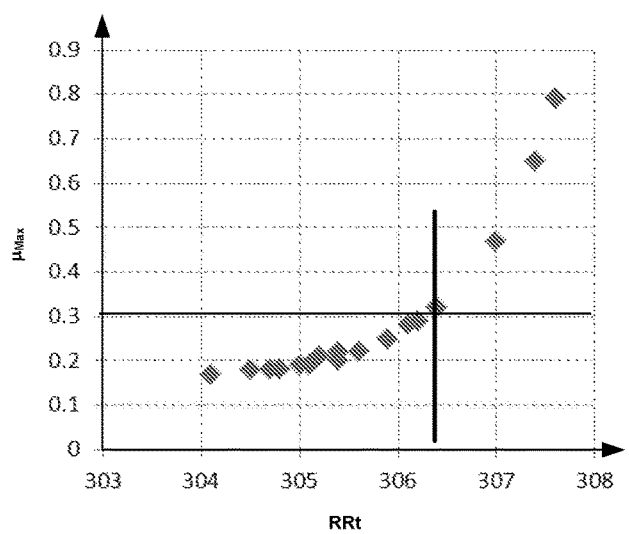
FIG. 5 represents an evolution of the error margin as a function of the rolling radius.

FIG. 5 shows in the same way the evolution of the accuracy of the value of the adhesion potential predicted using the model as a function of the rolling radius. This error increases with the rolling radius and the adhesion potential. The greatest errors correspond to the situation in which the deflection is the smallest, i.e. when the pressure is high and/or the load low. This is rare in real life situations.

Also, to improve detection reliability, it may prove necessary to limit the application of the model to configurations in which the rolling radius is below a particular threshold, such that the adjustment error is typically less than 0.3, for example. In the situation shown in FIG. 5, use of the model will therefore be limited to rolling radii less than 306.5 mm.

Figure 6:
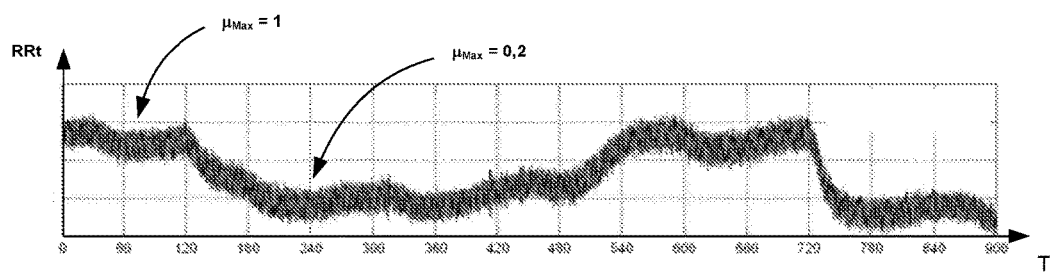
FIG. 6 represents an evolution of the calculation of the predicted adhesion potential when travelling under variable adhesion conditions.

FIG. 6 shows a recording of the value of the rolling radius $\mu_{max}$ measured when travelling over ground having variable adhesion coefficients during a journey of 15 minutes. At the beginning of the recording, the ground offers high adhesion ($\mu_{max}=1$); after two minutes the adhesion conditions and the rolling radius are strongly degraded ($\mu_{max}=0.2$).

The proposed method therefore makes it possible to obtain reliable information on the evolution of the adhesion potential, a knowledge of which is essential for the safety of the vehicle, taking into account a phenomenon impacting directly on this parameter.

The embodiments of the invention providing a basis for the present description are therefore not limiting on the invention and, as already shown, may be implemented differently provided that this makes it possible to obtain the technical effects described and claimed.

The method of the invention has been illustrated in the case of passenger vehicle tires, but also applies to any type of tire, notably for agricultural vehicles, heavy goods vehicles, two-wheeled vehicles and civil engineering plant.

The invention claimed is:

1. A method for determining an adhesion potential ($\mu_{max}$) of a tire mounted on a wheel of a vehicle travelling over ground, the method comprising steps of:
   (a) constructing a database of information obtained by evaluating experimental data on an evolution of a rolling radius (RRt) of the tire as a function of predetermined rolling conditions of the tire on ground of variable and known adhesion;
   (b) based on the information in the database, establishing an adhesion-potential estimation model ($M_{adpot}$) by determining a function linking an adhesion potential ($\mu_{max}$) of the tire to the rolling radius (RRt) of the tire and to vehicle parameters; and
   (c) determining the rolling radius (RRt) of the tire while the tire is rolling, and determining the adhesion potential ($\mu_{max}$) of the tire as a function of the vehicle parameters by applying the adhesion-potential estimation model ($M_{adpot}$).

2. The method according to claim 1, wherein the rolling radius (RRt) of the tire is determined by establishing a ratio between a speed of movement ($V_{sol}$) of the vehicle relative to the ground and a speed of rotation ($\Omega$) of the wheel about an axis of the wheel according to:

$$RRt = V_{sol}/\Omega.$$

3. The method according to claim 2, wherein the rolling radius (RRt) of the tire is determined by averaging rolling-radius measurements of the tire acquired during a mean period.

4. The method according to claim 3, wherein the mean period is between 1 and 10 seconds, inclusive, with between 2.5 and 3.5 seconds, inclusive, being preferable for the mean period.

5. The method according to claim 4, wherein the rolling radius (RRt) of the tire is determined by using the speed of movement ($V_{sol}$) of the vehicle relative to the ground obtained using a GPS system onboard the vehicle and the rotation speed ($\Omega$) of the wheel obtained using a coder that generates a plurality of pulses on each wheel revolution.

6. The method according to claim 5, wherein the rolling radius (RRt) of the tire is determined on each pulse generated by the coder.

7. The method according to claim 1, wherein the adhesion-potential estimation model ($M_{adpot}$) is applied when the rolling radius (RRt) of the tire is below a predetermined threshold.

8. The method according to claim 1, wherein the adhesion-potential estimation model ($M_{adpot}$) estimates the adhesion potential ($\mu_{max}$) according to:

$$\mu_{max} = \alpha_1 e^{(RRt)} + \alpha_2 Z e^{(RRt)} + \alpha_3 P e^{(RRt)} + \alpha_4 Z + \alpha_5 P + \alpha_6 PZ + \alpha_7,$$

where RRt represents the rolling radius of the tire, Z represents a load applied to the wheel, P represents a tire pressure value, and $\alpha_1$, $\alpha_2$, $\alpha_3$, $\alpha_4$, $\alpha_5$, $\alpha_6$, $\alpha_7$ are constants.

9. The method according to claim 8, wherein the tire pressure value (P) is given by:

$$P = P_{TPMS} + \alpha_8 V_{sol}^2,$$

where $P_{TPMS}$ represents a value of a pressure given by a sensor accommodated inside the tire, $V_{sol}$ represents the speed of movement of the vehicle relative to the ground, and $\alpha_8$ is a constant.

10. The method according to claim 8, further comprising a step of:

(d) determining a free load ($Z_{free}$) applied to the wheel by carrying out the steps (a), (b), and (c) during which, when the vehicle is not engaged in a turn and is not subject to any transverse or longitudinal acceleration, when a zero drive or braking torque is applied to the wheel, and when the wheel is under free rolling conditions:

detecting that the ground on which the vehicle is travelling is dry, estimating the rolling radius (RRt) of the tire, and searching for a value of Z that causes the adhesion-potential estimation model ($M_{adpot}$) to determine the adhesion potential ($\mu_{max}$) to be equal to 1, the value of Z corresponding to the free load ($Z_{free}$).

11. The method according to claim 10, further comprising a step of determining a mean free load ($Z_{meanfree}$) during a period when the ground on which the vehicle is travelling is dry.

12. The method according to claim 10, wherein the adhesion potential ($\mu_{max}$) is determined using the adhesion-potential estimation model ($M_{adpot}$), and based on the rolling radius (RRt) of the tire, the tire pressure value (P), and the free load ($Z_{free}$) or the mean free load ($Z_{meanfree}$).

13. The method according to claim 10, wherein the adhesion potential ($\mu_{max}$) is determined using the adhesion-potential estimation model ($M_{adpot}$) and based on the rolling radius (RRt), the tire pressure value (P), and the load (Z) equal to an instantaneous load ($Z_{inst}$) applied to the wheel and calculated using a function defining a dynamic of the vehicle corresponding to vehicle data at a given moment that includes any one or any combination of two or more of:

the free load ($Z_{free}$) on the wheel or the mean load ($Z_{meanfree}$), a drive or braking torque, a drift angle, transverse and longitudinal accelerations, and a camber angle.

14. The method according to claim 8, wherein the load (Z) is determined as a function of a measurement of a distance between a point situated on a chassis of the vehicle and a point situated on a support of the wheel and a stiffness of a suspension connecting the support to the chassis.

15. The method according to claim 1, wherein the adhesion potential ($\mu_{max}$) of the tire determined in the step (c) corresponds to a tire mounted on a non-steered and non-driving wheel.

* * * * *